United States Patent [19]

Sharples, Jr. et al.

[11] Patent Number: 4,811,325
[45] Date of Patent: Mar. 7, 1989

[54] HIGH-SPEED REPRODUCTION FACILITY FOR AUDIO PROGRAMS

[75] Inventors: Thomas D. Sharples, Jr., Redwood City; John C. Weitz, Belmont; Ichyterra Ganapathy, Palo Alto; Michael Poimboeuf, Redwood City; Hugh Macdonald, Menlo Park; Charles E. Garvin, San Francisco, all of Calif.

[73] Assignee: Personics Corporation, Menlo Park, Calif.

[21] Appl. No.: 108,618

[22] Filed: Oct. 15, 1987

[51] Int. Cl.⁴ .............................................. G11B 7/28
[52] U.S. Cl. ......................................... 369/85; 360/15
[58] Field of Search ...................... 360/15; 369/84, 85, 369/30

[56] References Cited
U.S. PATENT DOCUMENTS

| | | | |
|---|---|---|---|
| 3,947,882 | 3/1976 | Lightner | 360/15 X |
| 4,320,486 | 3/1982 | Codey et al. | 360/15 X |
| 4,703,465 | 10/1987 | Parker | 360/15 X |

Primary Examiner—Robert L. Richardson
Attorney, Agent, or Firm—Cushman, Darby & Cushman

[57] ABSTRACT

Data processing system for high-speed reproduction of musical recordings at a point-of-sale terminal utilizes optical CD music ROM banks of master programs prerecorded by a Dolby ADM (adaptive delta modulated) technique to condense their "information" content. Condensation permits higher data throughput during high-speed reproduction. In a "premastering" process to make encoded masters, a special multiplexer board provides interfacing between Dolby ADM digital audio data and a conventional data processing system. The multiplexer board performs computer-like data blocking and also writes a unique sync code directly in the data block. The data processing system also catalogs and edits the blocked digital audio; places encrypted catalog, pricing, and other indicia in the data file representing the music; and sends the data file to convention 16-bit PCM file writer for making the encoded CD music ROMs which contain the ADM data representing the encoded audio program. A high-speed reproduction device, under control of a desk top personal computer, extracts timing and ADM data from the CD music ROM at high speed and controls high-speed tape drives to compile selected recordings on a single cassette tape in a form-compatible with Dolby B noise reduction.

26 Claims, 8 Drawing Sheets

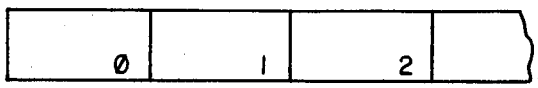
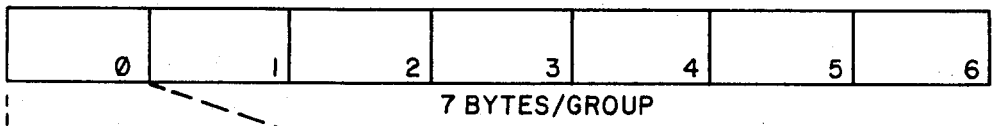
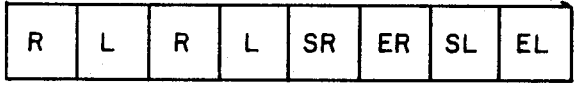
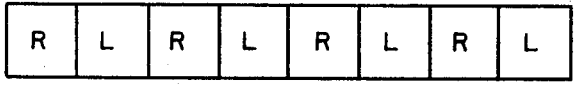

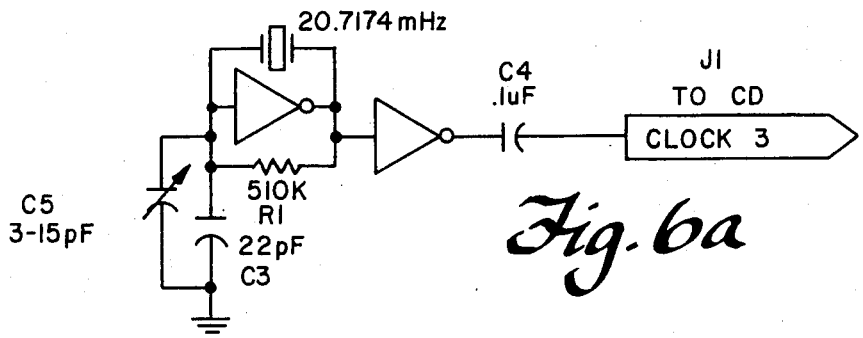
Fig. 6a
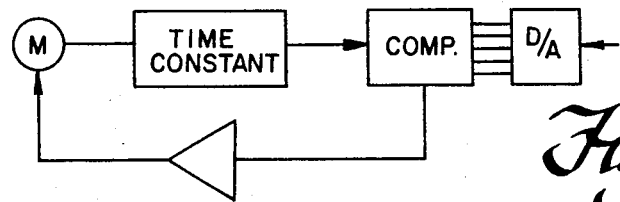
Fig. 6b
Fig. 6c
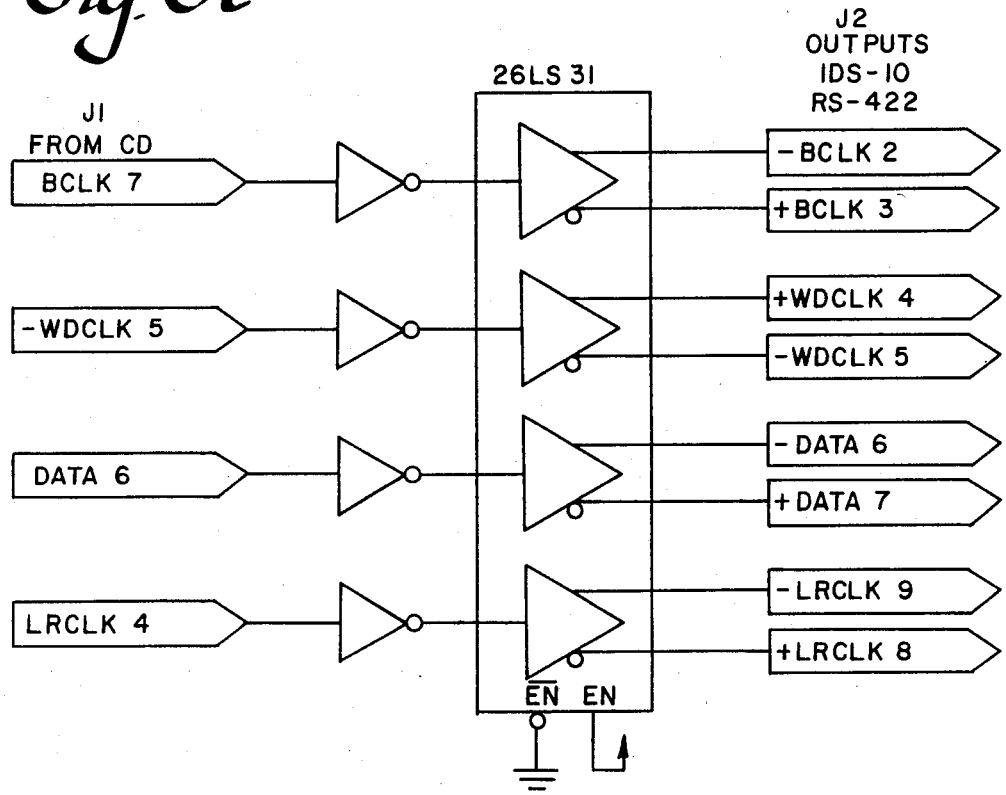

HIGH-SPEED REPRODUCTION FACILITY FOR AUDIO PROGRAMS

CROSS-REFERENCE TO RELATED PATENT AND PATENT APPLICATIONS

This invention relates to commonly owned U.S. patent application titled "System For Encoding Sound Recordings For High-Density Storage and High Speed Transfers", Ser. No. 108,617, filed of even date herewith which we incorporate herein by reference.

This invention also relates to commonly owned U.S. patent application, titled "Bias Control In Apparatus For Tape Recording", Ser. No. 109,190, filed of even date which we also incorporate herein by reference.

BACKGROUND OF THE INVENTION

The present invention pertains to a system providing high-speed reproduction of audio programs from master recordings of audio programs, such as sound recordings (e.g. music), at high real time speeds, but more specifically, to a reproduction method and apparatus for producing a personalized custom compilation of audio programs of high sound fidelity.

Problems of the art herein addressed include those of distributors and retailers, on one hand, and purchasers of sound recordings, on the other hand. In the sound recording industry, retailers and distributors encounter difficulties in shipping, storing and handling relatively large volumes of tapes, records and compact discs—expending substantial time and money. It is an endless effort to meet volatile and unpredictable demands of customers for popular recordings. Very often, they cannot maintain sufficient stock to meet volatile demand, and stock on hand often suffers damage due to handling. In instances of weak demand, the retailer simply does not carry certain items of music, such as classical and jazz, and thus cannot satisfy his customers. Employee pilferage presents an additional menace. Moreover, in certain high traffic communities, a premium is placed on expensive storage and display space and the retailer finds it impractical to stock a variety of audio programs.

For many of these same reasons, purchasers become frustrated in their endeavor to satisfy their own desires of listening pleasure. Very often, a purchaser enters a retail establishment to browse and listen, but encounters reluctance on the part of retailers to permit listening because of among other things, damage risk, time consumption, and package disruption. Further, because of poor sound fidelity and deterioration of most tape and vinyl media, these sound recordings have a lot be desired.

Important to a specific problem of the art that the present invention addresses is that no practical system yet exists for providing a "customized" group of selections on any recording media quickly at the point of sale. For this reason many customers make their own custom recordings. These so called "home recordings", however, run counter to yet other interests, e.g. that of artists and authors. Home recordings of copyrighted recordings not only may be illegal, but they often have such poor sound quality since they are made on consumer grade equipment, and are not made from first generation master recordings. Fourth of fifth generation slave recordings have very limited dynamic range, often unacceptable noise levels, and inherent distortion.

As a substantial contribution to the arts, the present invention aims to solve the aforementioned problems of retailers, distributors, customers, artists and authors. By providing a practically realizable store of concentrated digital representations of a multitude (15,000) of master recordings immediately retrievable and reproducible at a "point of sale" and at very high fidelity; providing a means by which these programs can rapidly be reproduced at greater-than-real-time speeds without undue waiting on the part of the customer; and yet further providing an automatic system of accounting in combination with sales so that authors can properly be rewarded for their artistic creations, then and only then can the needs, desires and expectations of all can be served simultaneously.

Attempts in the past were made to, achieve this goal, at least in part. None, however, has proven commercially successful, marketable or even practicable in a real life world in view of the relatively large amounts of data which must be handled. For instance, a juke box for retrieving slave recordings, then reproducing them is known, but prior information storage media have limited capacity to archive a practical number of master recordings of at least a few thousand or more. A practical system requires gigabytes of storage and data transfer rates of several magabytes/second in a form suitable for today's data processing systems. A present-day conventional processing system employed in this technology has a limited effective data transfer rate of about 100 to 200 kbytes/seconds. PCM (pulse-code-modulation) encoded music, for example, requires a minimum data transfer rate of about 176 kbytes/second while faster-than-real-time recording, say eight times, requires a transfer rate of 1.4 megabytes/second. Sixteen-bit PCM encoded music requires about ten megabytes of storage for each minute of music. In light of these constraints, it is evident that present systems can neither handle high-speed recording nor high volume archiving.

Prior systems not only lack the ability to produce high fidelity recordings, but either failed to offer faster-than-real-time recordings, or were too slow in data transfer rate to be effective. Attempts even were made to transmit from a central store digital representations of sound recordings over public communications networks, such as telephone lines or other public communications networks, but this technique proved impracticable due to a bottleneck in the data transfer rate and a consequent "slow" recording rate over the network. Purchasers simply will not wait one-half hour for a three-minute recording. One proposed approach utilized a wide-band "picture phone" system with a central database, but the "picture phone" system never became commercially available, and similar to satellite systems, is not cost-effective. Exemplary prior systems include those disclosed in U.S. Pat. Nos. 4,528,643; 3,444,334; 4,410,917; 3,947,882; 3,718,906; 3,609,227; 4,355,338; and 3,311,378.

Accordingly, it is a general objective of the present invention to provide a practical distribution and reproduction system suitable for making high-speed customized selections of audio programs of high fidelity wherein the programs are reproduced on a slave recording medium directly from a high volume information store of master programs.

It is another objective of the present invention to provide a method and apparatus for handling digital data representations of sound recordings by low-cost desktop data processing techniques in order to provide efficiency and practicality in producing high-speed, high fidelity recordings.

Another objective is to provide a method and apparatus for combining digital audio processing systems and techniques with digital data processing systems and techniques for handling audio programs.

It is another objective of the present invention to permit solution of royalty reporting concerns of authors and artists by providing a centralized computer accounting system for tracking sales and distribution of audio programs.

It is yet a further objective of the present invention to solve distributor and retailer problems of stocking, volatility of demand, damage due to handling and shipment, limited space, poor range of selection of audio programs, and stock out problems frequently encountered in retailing audio programs.

It is yet a further objective of the present invention to solve customer concerns of poor fidelity, deterioration of recording medium, limited selection of programs, and desirability of custom groups of recordings on a single tape or disk.

It is yet a further objective of the present invention to provide a system for permitting tallying of sales for royalty reporting, monitoring trends, and remotely updating distribution facilities with modified pricing and availability of audio programs, as needed.

It is a further objective of the present invention to provide faster-than-real-time recording of audio programs to minimize customer waiting time while making customized groups of audio selections.

It is also an objective to provide a practical information store or archival system for premastering original master recordings in order to reduce the quantity of storage space required for a multitude of selections while at the same time enabling high-speed and high-fidelity reproduction thereof.

Another objective of the invention concerns developing a premastering system comprising time-domain condensed digital data signals representing audio programs enabling storage of a large quantity of programs in a relatively small storage space and to facilitate higher-than-real time recording of audio programs.

It is another objective of the invention to provide a servo biasing scheme for reproducing the audio programs on a slave medium thereby to retain a substantial portion of dynamic range of the master recording.

Another objective of the invention is to provide redundant memory devices in a controller for reproducing audio programs at specifically timed and/or spaced locations on a slave medium at regular intervals on the medium thereby to provide a slave medium containing readily accessible and identifiable programs.

SUMMARY OF THE INVENTION

In accordance with the foregoing objectives, the invention comprises a method and apparatus useful for rapidly reproducing audio programs on a slave medium from encoded representations of audio programs stored in a master medium in order to compile a custom group of the programs for personal listening. Encoded programs on the master medium include indicia and timing data for transfer control of audio program in the data processing environment. Catalog data is also use in printing custom labels and J-cards for the slave medium.

The preferred method includes the steps of detecting timing signals embedded in digital data representations of encoded master programs, extracting the encoded master data and associated indicia data utilizing the embedded timing signals, decoding the encoded master data and catalog data, transferring the decoded catalog data to a data processing system, transferring decoded master data to a slave reproduction device at high speeds, and controlling the transfer of decoded master data according to the catalog or other indicia data thereby to reproduce the audio program on the slave medium. Indicia data includes information relative to the length of the audio program. Preferably, the extraction of encoded master data is synchronized with the transfer of decoded master data to the high-speed slave reproduction device. Also, the preferred method includes the additional step of providing dual redundant encoded master data banks, queuing alternate data banks during successive recording of plural audio programs in a custom compilation thereof, and placing a precise amount of silence between successive programs on the slave medium.

In the preferred implementation of the apparatus, several compact disc music ROMs storing encoded digital data of master programs constitute the master medium, and magnetic cassette tapes constitute the slave medium on which audio programs are recorded in analog form. Digital encoding of master programs preferably is accomplished by Dolby Delta-link adaptive delta modulation (ADM) in order to obtain efficiently sampled and time-domain condensed data representations of audio programs for high information throughput in the recording process. However, masters may be made by other data condensation or high-efficiency analog-to-digital sampling techniques during the premastering process. Dual CD music ROM banks containing redundant libraries are also employed to expedite the high-speed recording process of successive audio programs. In this fashion, the system readies itself by positioning the next program while recording a preceding program on the slave medium. Moreover, the system includes a servobiasing scheme operative to improve fidelity during the recording process of tape cassettes.

Significantly, the present invention allows, at the point-of-sale, the creation of personalized compilations of plural audio programs on a single cassette at greater-than-real-time speeds. Advantageously, the devices and processes presented herein provide production of first generation slave recordings on a slave medium directly from a master recording where the slave has exceptional fidelity to the ultimate satisfaction of the customer, minimum waiting due to high-speed reproduction, customized selections of desired programs, diversion of piracy due to home recording, prompt and accurate royalty reporting, convenient monitoring of popular trends, elimination of risk of damage of conventional recording mediums, reduced freight and handling costs on the part or music distributors, elimination of pilferage and return processing, and specially formatted slave recording mediums precisely located and spaced, among other things.

Additional aspects and advantages of the invention will become apparent upon review of the succeeding disclosure take in connection with the accompanying drawings. The invention though is pointed out with particularity by the appended claims.

BRIEF DESCRIPTION OF THE DRAWINGS

FIG. 2 depicts a preferred data blocking structure chosen for manipulating digital audio data according to an aspect of the present invention.

FIGS. 3(a) through 3(d) are timing diagrams illustrating data emissions of digital audio data encoded by an adaptive delta modulation technique in accordance with one aspect of the present invention.

FIG. 6(a) is a clock circuit which drives CD music ROMs of the system of FIG. 5 according to an aspect of the present invention.

FIG. 6(b) depicts a servo control loop for controlling the speed of the CD music ROM of FIG. 5 according to an aspect of the present invention.

FIG. 6(c) depicts the outputs of the CD music ROM of FIG. 5 according to an aspect of the present invention.

DESCRIPTION OF ILLUSTRATIVE EMBODIMENT

Figure 1:
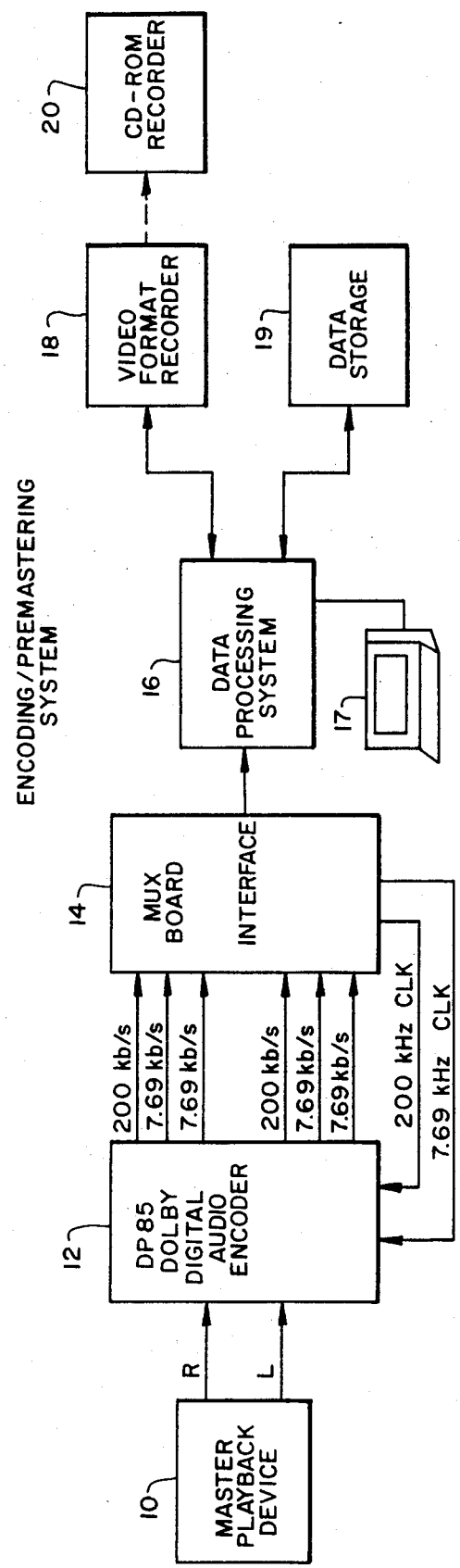
FIG. 1 is a system block diagram of a premastering system useful for preparing master recordings used in the high-speed reproduction system of FIG. 5.
Figure 7:
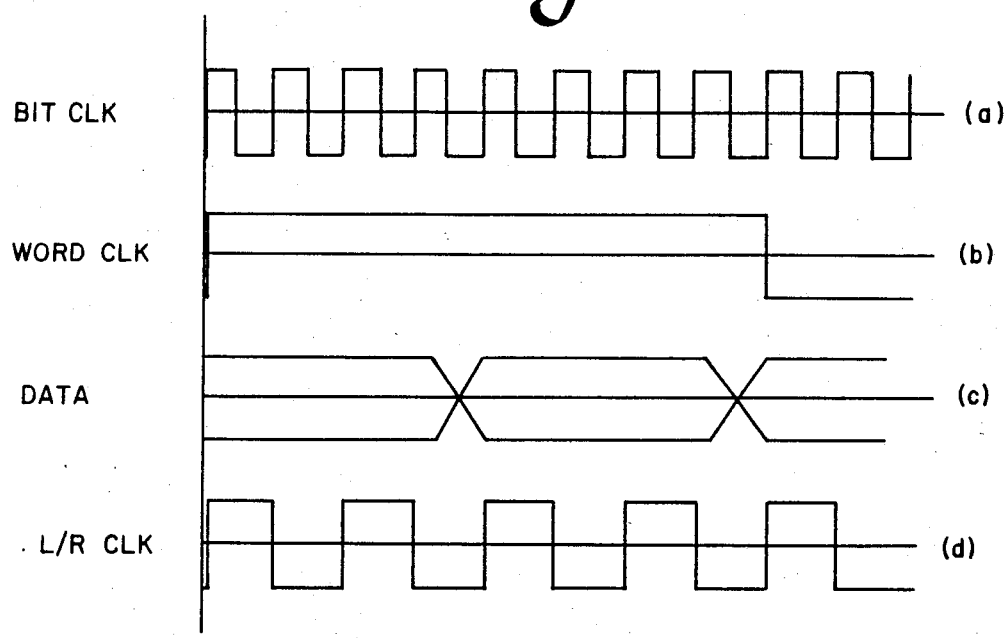
FIG. 7 is a timing diagram illustrating the relationship among the high-speed digital data streams decoded by the ADM-to-analog decoder of FIG. 5 in accordance with an aspect of the present invention.

A preferred arrangement of a high-speed reproduction system of the present invention includes data processing system which receives purchaser information from an order entry terminal (not shown here) via a communication link. The purchaser information may take the form of digital identification data that specifies unique audio programs to be compiled, as well as other associated information, such as, pricing, title or author information. Order entry information may emanate from a local area network which couples an order entry terminal directly on the same premises as the high-speed reproduction system, or alternatively, may be communicated from distant locations via link, such as, telephone lines. Order entry information may include the customer's name and a title for the customized cassette tape or other slave media. This information would then be printed under computer control on the J-card or sleeve that accompanies the cassette tape or slave media.

In response to the order entry information, data processing system, by way of a user terminal, controls high-speed information flow between CD music ROM drives, on one hand, and a high-speed cassette recorder to produce, a customized selection of audio programs requested by a purchaser, on the other hand. Custom labels and J-cards are simultaneously printed by a laser printer for affixation to the slave media.

I. General Overview

The invention is described by way of an example of a preferred apparatus and method for compiling custom group of audio programs by reproducing them from an encoded master medium onto a slave medium. The apparatus uses several components, some of which are already commercially available. Other components of the invention which we modified or developed ourselves are described in detail. For the sake of convenience, we describe herein a reproduction system operating at eight times real-time speeds, e.g. 8×, although other speeds can be chosen. We also chose to describe CD music ROMs as the encoded master medium and magnetic tape cassettes as a slave medium, although the invention has application to other media, such as data storage disks, vinyls, and other magnetic tapes. Using CD music ROMs, we attained storage of 15,000 individual music selections in just a few cubic feet of space In order to make these high-speed recordings, we first developed the premastering/encoding system of FIG. 1 which functions to make the specially encoded master recording in an efficiently sampled or "condensed" form from an original master sound recording or other audio program. Such sampling advantageously permits high "information" throughput upon decoding to achieve high speed reproduction. The encoded master is then used in the decoding/reproduction system of FIG. 5 to reproduce the custom compilation of programs on the slave medium at high speeds.

Two alternative encoding methods were contemplated—a first being data condensation after A/D conversion of source programs during the premastering process, and a second being the use of a higher efficient sampling system during A/D conversion, e.g., higher than PCM encoding. A standard 16-bit PCM system, for example, requires a throughput of about 1.4 megabytes/second which cannot be met with prior systems such as that described in U.S. Pat. No. 4,528,643 to Freeney.

In the encoding/premastering system of FIG. 1, we chose to encode masters using the Dolby delta-link adaptive delta modulation (ADM) technique described in Audio Engineering Society (AES) Paper No. 2071, 75th Convention, Paris 1984, by Todd, et al. Upon decoding, the Dolby Delta-link ADM system utilizes a delta decoding integrator attached to both a step-size restorer to avoid slope overload and a sliding-band voltage-controlled equalizer which serve to mask noise psychoacoustically by concentrating channel energy in the area containing stochastic or non-correlated information while minimizing transfer of audio redundancies. In actual practice of the invention, we chose to use a data channel sampling rate of 200 kb/s (kilobits/second) having associated side chain rates of 1/26th of the channel sampling rate for step-size and emphasis control.

When the above sampling rate is utilized, Dolby ADM encoded data has a 3.2:1 density advantage over conventional 16-bit pulse code modulation (PCM) data, and for this reason we realize this same efficiency ratio over PCM. However, PCM data handling and processing techniques have the advantage of being well-developed in terms of available equipment for playback and recording in the music industry, so we developed a method and apparatus for writing ADM data, along with other indicia and identifying data, in industry standard PCM data format on CD music ROMs, and interfacing the PCM and ADM systems with a data processing system. Problems encountered include interfacing digital audio data with data processing system for editing and manipulation, data blocking and sync writing in a non-mapped CD music ROM medium, and interfacing edited and manipulated data with PCM systems for making CD music ROMs.

Figure 5:
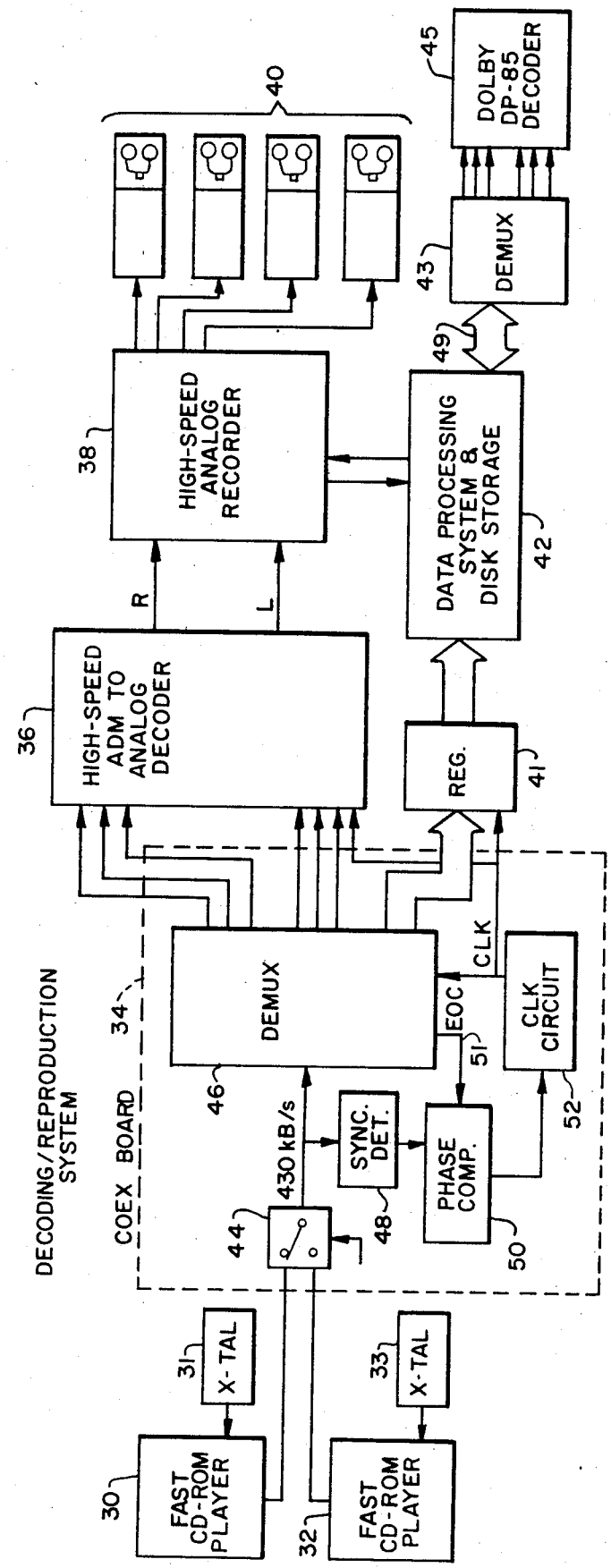
FIG. 5 is a system block diagram of a preferred high-speed decoding/reproduction system illustrating an apparatus and method by which the invention may be carried out.

We then utilize these specially prepared premastered media in the decoding/reproduction system of FIG. 5 in order to produce high-speed recordings on a slave medium. In reproducing at high speeds, we developed clock and data recovery algorithms for extracting non-mapped data from encoded masters and for demultiplexing data t reestablish data streams akin to the Dolby ADM format. We also developed methods and apparatuses for controlling the processes of making high-speed recordings on the slave media, extracting textual data, and for printing custom labels for attachment to the slave media. Problems solved include increasing data outputs of CD music ROMs to achieve 8× or higher recording speeds, recovery of sync signals and timebase corrections, and providing high-speed D/A conversions for analog recording in slave media.

II. Encoding/Premastering System

A. System Concept

Referring to FIG. 1, the preferred encoding or premastering system includes a conventional audio playback device 10 for producing left and right analog stereo signals, a Dolby ADM audio encoder 12 for converting the stereo signal pair to ADM six digital data streams, an interface 14 for multiplexing and data blocking the ADM data streams, a data processing system 16 which performs a variety of functions including editing and manipulating, a PCM processor 18 coupled to the data processing system 16 through a Sony 1610 interface board 19 for making a standard 16-bit PCM data tape contain ADM data, and CD music ROM recording system 20 for writing the edited and manipulated ADM data from the PCM processor 16 on a CD music ROM. The system 20 preferably is a remote commercial facility which converts PCM tapes to CD music ROM disks, and includes a 1610 tape player 20a, a digital PC converter 20b, and a CD music ROM laser writer 20c.

B. Master Playback Device 10

The playback device 10 comprises a conventional player which produces left-right stereo analog signals, and supplies the same to the Dolby encoder 12. Since original master recordings can originate from magnetic tapes, CD music ROMs, or other media, device 10 may take on a variety of forms. Stereo audio programs are most desirable, but programs originating on a single channel (e.g. mono) may also be reproduced.

C. Dolby DP-85 Digital Audio Encoder 12

In the case of starting with analog audio signals of a master recording, we utilized a Dolby encoder 12, model DP-85 ADM digital audio processor, manufactured by Dolby Systems, Incorporated of San Francisco, Calif. The encoder 12 provides some flexibility in choosing a sampling rate of the analog signals. It receives left-right analog stereo signals and generates six digital data streams akin to the Delta-link processing technique. For each stereo channel, processor 12 outputs a 200 kilobits/second (kb/s) audio data stream and two 7.69 kb/s side data stream of emphasis and step- size, respectively, which control the decoder's equalization and step-size parameters. With this chosen rate, inherent anomalies in sampling the audio do not appear in cassette tape slave media due to the latter's bandwidth limitations. However, when using slave media other than cassette tapes, such as a compact disk, the Dolby sampling rate would be increased or other data condensation technique might be employed. In any event, the audio data stream from the Dolby encoder represents sampled analog audio signal in the channel.

D. ADM To DPS Interface 14

ADM/DPS interface 14 of FIG. 1 performs multiplexing operations and generates clocking signals for the Dolby encoder 12 for each stereo channel. It converts the ADM bit serial streams to a form compatible with an 8-bit parallel bus. The clocking signals are 5 $\mu$s and 130 $\mu$s clock pulses, respectively, for the channel data and side chain data streams.

According to its timing operation, a 4-bit nibble of side chain data is accumulated and written in a buffer in burst mode every six-and-a-half bytes of channel data in order to attain the data format shown in FIG. 2. Interface 14 also converts the rather unique Dolby ADM data streams to a form suitable for processing by the processor 16. Depending on the input requirements of the data processing system 16, data may be transmitted serially or in parallel. In the preferred implementation as shown in FIG. 1, interface 14 blocks the data into 1024-byte data blocks as indicated in FIG. 2, writes a unique 16-bit sync word in the last two bytes that are utilized in the high-speed reproduction system described below, and transmits them in 8-bit wide bytes to an input port of the data processing system. The 1024-byte data blocks form the basis by which music data can be manipulated and stored in the data processing system 16 and retrievably written on a non-mapped CD music ROM comprising the master medium.

E. Data Blocking & Timing Scheme

Figure 4:
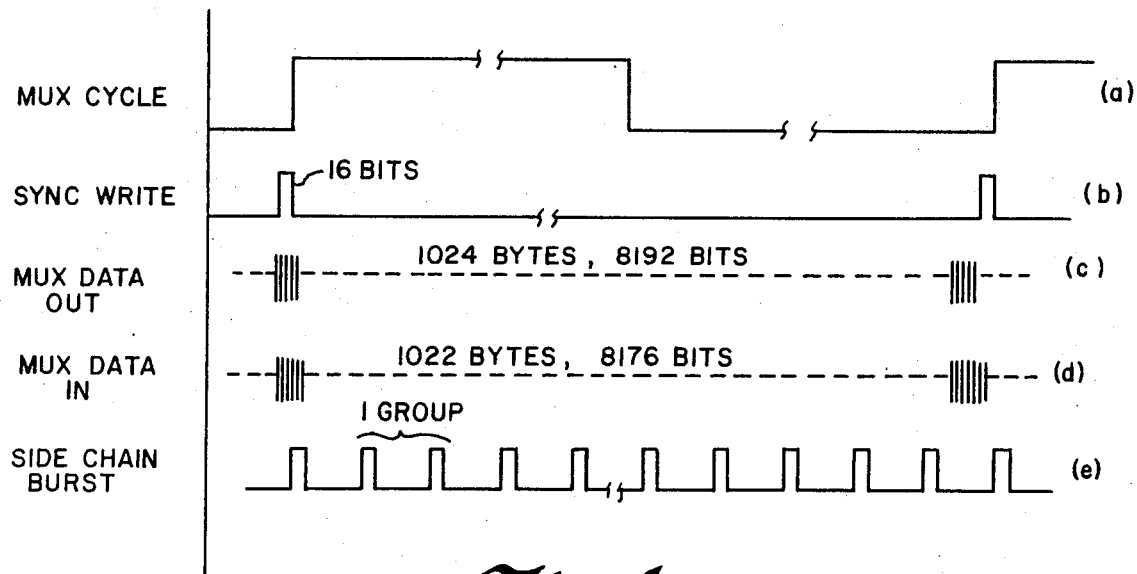
FIGS. 4(a) through 4(e) are timing diagrams illustrating the relationship among various signals processed in the decoding/reproduction system of FIG. 5.

With reference to FIGS. 2 and 4. the preferred data blocking structure produced by interface 14 conveniently packs ADM audio data into one-hundred-forty-six groups of seven bytes each, totalling 1022 bytes, during each cycle of the interface 14. Timing operations of the multiplexer 14 are derived from constraints imposed by the data blocking scheme depicted in FIG. 2. In explanation of the ADM data codes in FIG. 2, L=left channel audio data bit
R=right channel audio data bit
EL=left channel emphasis data bit
ER=right channel emphasis data bit
SL=left channel step size data bit
SR=right channel step size data bit The first byte in each group (byte zero) contains side chain data bits (SR, ER, SL, EL) whereas the remaining bytes contain channel data bits (L, R). Since side chain data is generated by 130 $\mu$s clock pulses, interface 14 accumulates a 4-bit nibble of side chain data every 130 $\mu$s and appends the nibble to a 4-bit nibble of channel data in a "burst" data transfer operation as shown by side chain data burst pulses in FIG. 4(e). The burst pulses occur once during each 7-byte group. With the two-byte (16-bit) sync word appended to the 1022-byte ADM data, the interface compiles a fully occupied 1024-byte data block which advantageously can be stored in and retrieved from a conventional data storage device 19 (FIG. 1) coupled to the processor 16 without "gaps" in the data file.

The total bit rate transfer from Dolby encoder 12 to interface 14 is 430.77 kbs (kilobits/second) or 53.85 kBs (kilobytes/second) at 1X speed, e.g., real time speed. However, because interface 14 adds a 16-bit sync word, the actual bit rate transferred to the processing system 16 is slightly higher. Thus upon decoding this data, time-base correction is employed to retrieve the precise real time clocking relationship of the information stored in the CD music ROMs constituting the master. As depicted in FIGS. 4(c) and 4(d), 1024 bytes are transmitted by the interface 14 in the same time period of receiving 1022 bytes of ADM data. Thus upon decoding, the 1022-byte information block is "stretched out38 to the 1024-byte time period. In this fashion, time-base corrected data output from the CD music ROM bears a defined relationship with the real time recording period so as to accurately recover the ADM clock pulses and achieve reproduction at precise multiples of real time.

F. Sync Word

The preferred 16-bit sequence comprising the sync word is hexadecimal "AAAA" and was determined by histographic analysis to be one of least occurrence in the data bit stream of music data. Interface 14 writes the sync word at the end of each data block upon transmission to the data processing system 16. Since the sync word is extracted by the decoding/reproduction system for block identification, clocking, and time base correction, it is important to make it unique from other possible sequences in the data stream. Preferably, the sync code should have the greatest Hamming distance from other 16-bit sequences which might appear in the music data.

G. Editing and Manipulation ADM Music Data

The processor 16 includes a terminal 17 and winchester disk 15 used by an operator to place in the premastered data file identifying and other indicia and/or catalog data, such as author, title, song length, publisher, pricing or royalty codes, dates, version number, etc. For security purposes, processor 16 may include conventional software for encrypting this information using conventional techniques, so as to avoid unauthorized access thereto. Once edited, processor 16 then transfers the blocked data file representing the original program from the storage disk 19, to a commercially available Sony 1610 or 1630 DMR-2000 video format recording system 18 through a special board 19 which interfaces them. A multitude of such data files of encoded master programs are processed in this fashion and placed in video tape format by the video recorder 18 in order to create the premastered music libraries. Because the 1610 recorder 18 generates a standard video format magnetic tape but containing ADM music data, high-density CD music ROMs playable on standard CD music ROM players can advantageously be produced using standard commercially available CD music ROM mastering system 20. However, the CD music ROMs would contain our specially encoded master with encrypted catalog and indicia data, as well as the unique 16-bit sync signal.

H. DPS/PCM Interface 19

Interfacing between the data processing system 16 and video format recorder 18 is attained by providing an interface board 19 which allows the PC to download files to the standard digital serial links on the 1610. The interface 19 is a separate board residing in the data processing system 16. It is comprised of two parallel-to-serial converters with an addressable 1024-byte FIFO buffer in order to receive bytes from the data processing system 16 and to transfer them to the 1610/1630 system 18. The serial bit rate of the serial channels is servoed to the video reference clocks (44.1 KHz words per channel) from the 1610/1630 PCM recording system at 176.4 kilobytes per second. Data words of the stereo channels are transmitted from the FIFO buffer in successive bytes to the 1610/1630 system. There is a crystal controlled analog phase-locked loop circuit that tracks the clock in the 1610 Processor and generates a clock signal in the interface circuit to maintain the data rate. Every kilobyte of data generates an interrupt to tell the data processing system 16 to fill the FIFO to achieve asynchronous operation with any standard Sony digital interface.

I. PCM Processor 18 and CD Recording System 20

The PCM processor 18 employed is a commercially available Sony 1610 or 1630 digital audio processor available from Sony Corporation. In operation, the processor 18 has a 16-bit digital audio input and converts digital data received from the data processing system 16 to a 30 frame/second video format and records it on a standard ¾ inch U-matic video tape recorder. The U-matic tape is then delivered to a commercial CD music ROM manufacturer which uses the system 20 for making a CD music ROM containing PCM-like data constituting the encoded premastered media used in the decoding/reproduction system describe below. In the CD music ROM manufacturing process, a PCM tape player 20a reads PCM data from the magnetic tape produced by the 1610 processor 18 and converts it, in a digital PCM converter 20b, to a form compatible with the CD laser writer 20c. The CD laser writer 20c writes data onto the CD music ROMs to create the encoded premastered sound recordings utilized in the high speed tape maker.

III. Decoding/Reproduction System

A. System Concept

FIG. 5 illustrates a system for achieving high-speed reproduction of slave tapes and illustrates the preferred method by which the invention may be carried out. The decoding/reproduction system includes dual modified CD music ROM players 30 and 32 which playback the encoded masters, a CDEX board (CD Data Extractor) 34 for decoding digital data from a selectable one of the CD music ROM players 30 and 32 thereby to return the data to its native Dolby ADM format, a high-speed ADM D/A converter 36 operating at 8× speed of a standard Dolby ADM demultiplexer which serves to convert six ADM digital data streams into a pair of analog stereo signals, a high-speed analog recorder 38 for receiving the stereo signals and driving a tape controller, and a data processing system 42 for, among other things, controlling start/stop operation and stripping indicia data embedded in the data blocks from the CDEX board 34 and for preparing customized labels to be placed on the slave media. The CDEX board 34 includes several components for generating its own timing and control signals for transferring the ADM data about the system. It accordingly does not require a host processor for support.

The preferred method of the present invention includes the steps of detecting timing signals embedded in the encoded master recording, extracting the encoded master data and associated indicia data utilizing the embedded timing signals for block identification and time-base correction, decoding the ADM encoded master, decrypting encrypted indicia data, transferring the decrypted indicia data to a data processing system for label making and slave media control, transferring at high speed the decoded master data to a slave reproduction device, and controlling the transfer of decoded master data according to the program length and identification information contained in the indicia data thereby to reproduce the audio program on the slave medium. Preferably, the extraction of encoded master data is synchronized with the transfer of decoded master data to the high-speed slave reproduction device. Also, the preferred method includes the additional step of providing dual redundant encoded master data banks, queuing alternate data banks during successive recording of plural audio programs in a custom compilation thereof, and placing a precise amount of silence between successive programs on the slave medium. In practice, up to eight CDK-006 CD music ROM juke boxes can be utilized in the reproduction system.

B. CD Music ROM Players 30 and 32

The preferred CD music ROM players 30 and 32 of FIG. 5 comprise Sony CDK-006 juke boxes, commercially available from Sony Corporation, which we modified by adding crystal-controlled clocks 31 and 33, respectively, to attain precise data emission rates, and the addition of data output ports to transfer data to the CDEX board 34. The clocks 31 and 33 may be internal or external of the players 30 and 32 respectively. The CDK-006 comprises a carousel of sixty CD music ROMs which can store several thousand three-minute to four-minute audio programs.

Since standard CD music ROM players were employed, we also modified the spindle speed servo controller by changing the time constant in its servo loop to improve response time in order to control spindle speed to track the increased clock rate. Specifically, we increased the native 8.4672 MHz master clock rate of the CD music ROM player to 20.707386 MHz in order to achieve 8 × recording speed. This represents approximately 2.44 times the normal spindle speed increase which achieves 8× real time speed on decoding in view of the data compression factor of about 3.2:1 provided by the Dolby ADM encoding process.

FIG. 6(a) depicts a preferred crystal-controlled clock circuit for controlling the spindle speed so that the CD drive emits data at a precise multiple of real time. FIG. 6(b) shows the servo loop of the Sony CD music ROM players 30 and 32. By way of the clocks 31 and 33, cycling of the demultiplexing operations in the CDEX board 34 and ADM conversion operations by D/A converter 36 are synchronized with data flow from the CD music ROMs 30 and 32, as set forth below.

Referring to FIGS. 6(c), real time clock outputs of CD music ROM players include a 1.4112 MHz BIT CLOCK signal for strobing data from the CD player, an 88.2 KHz WORD CLOCK signal for marking accumulation of a 16-bit word, and a 44.1 KHz LEFT/RIGHT CLOCK signal for identifying left and right channel data in a stereo system. For 8× operations, the spindle speed is increased by the same ratio of increase as the native clock to the high-speed clock rate thereby become 3.4512 MHz for the BIT CLOCK, 215.7019 KHz for the WORD CLOCK, and 107.851 for the LEFT/RIGHT CLOCK as illustrated in FIG. 7(a) through 7(d). One WORD CLOCK pulse spans sixteen BIT CLOCK pulses, and a BIT CLOCK pulse occurs twice during a LEFT/RIGHT CLOCK pulse. A bit of PCM-like data, which is actually ADM data, is sampled at the DATA output (FIG. 6(c)) of the CD player 30 or 32 during each BIT CLOCK pulse.

C. CDEX Board 34

Referring again to the functional block diagram of FIG. 5, the CDEX board 34 receives the composite outputs from both high-speed CD music ROM players 30 and 32 through a switch 44 controlled by the processor 42. The processor 42 controls the switch between alternate positions to effect queuing of the ROM players 30 and 32 in accordance with user input data identifying the programs by catalog selection. While one programs is playing on a first CD drive, the second searches for the next program. The CD players 30 and 32 have duplicate libraries, thus by the end of recording of a first audio program, the processor 42 will have the second CD music ROM player in position ready to start recording the second audio program. According to this arrangement, processor 42 need not necessarily stop the recording process at the high-speed recorder 38. Thus at the end of recording the first program, the processor 42 readies the second CD player to initiate recording of the second program without delay. According to this arrangement, processor 42 need not stop the high-speed recording process of recorder 38 until completing a full compilation of a custom group of programs, or until the slave medium fills.

Further, processor 42 with the aid of the queuing arrangement, also places a precise amount of silence between successive recordings on the slave medium for index control in a slave medium player. Start-stop operations of the tape drive can be controlled by program length information embedded in the master program data.

A demultiplexer in the CDEX board 34 receives information from the output of the switch 44 and converts the composite digital data stream from a selected one of the CD music ROM players 30 and 32 into six digital data streams akin to the Dolby ADM encoding process, but at a much higher rate suitable for 8× recording of programs on the slave medium. The demultiplexer also preferably generates the system clock pulses which are derived from embedded timing data in the ADM digital data blocks emanating from the CD music ROM players 30 and 32. To generate the timing signals, the CDEX board also includes a sync detector couples the transmission path of the data from switch 44 and functions to identify the unique 16-bit sync code embedded in the encoded data blocks during the premastering process. The sync detector is strobed by the WORD CLOCK signal (FIG. 7(a) in order to read the data content of the composite bit stream from the selected CD music ROM drive.

One manner implementing such a sync detector is to provide a 16-bit serial register through which the composite digital ADM data flows, comparing the shift-register contents with the unique 16-bit code, and then triggering a pulse upon a match in the comparison. Other methods may also be employed as known in the art.

A phase comparator in the CDEX board 34 compares the occurrences of the triggered pulses with an end-of-cycle (EOC) bit indicating completion of a demux cycle. The EOC bit indicates a completion of demultiplexing precisely one 1022-byte data block. In actual practice, demultiplexer issues its EOC signal every 15,184 cycles. A comparison of the phase difference between the EOC bit and the sync triggering pulse then drive an adjustable clock circuit which produces a native timing signal for the demultiplexer and the high-speed ADM-to-Analog decoder 36 thereby to synchronize the cycling of the demultiplexer with the emissions of data blocks from the CD music ROMs 30 and 32. In essence, the demultiplexing operations track the CD music ROM players so advantageously there is no need to buffer hugh amounts of digital data as otherwise would be required.

The crystal-controlled clocks 31 and 33, which were discussed above relative to the CD music ROMs, stabilize data flow rates of the entire system. Of several approaches envisioned, we considered this to be the best implementation of the invention but do not so limit our invention to this embodiment.

Further, the demultiplexer strips off the 16-bit sync word for its own use and transmits only 1022 bytes of data to the decoder 36. No sync bits are sent to the ADM analog decoder 36. However, a first-in/first-out (FIFO) buffer in the multiplexer forces coincidence between its 1024-byte data block reception cycle and its 1022-byte data block transmission cycle, and therefore provides inherent time-base correction when converting the remaining 1022-byte of ADM data to a precise multiple of real time.

The demultiplexer also ports high-speed ADM data to both the ADM-to-analog decoder 36 in the Dolby ADM format. It strips off encrypted textual and other indicia information included in the data block and sends them to a buffer connected with the data processing system 42 in a format compatible with the system 42. Processor 42 among other things records the transaction, effects printing of custom labels, and permits real time listening during the high-speed transfer.

Figure 8:
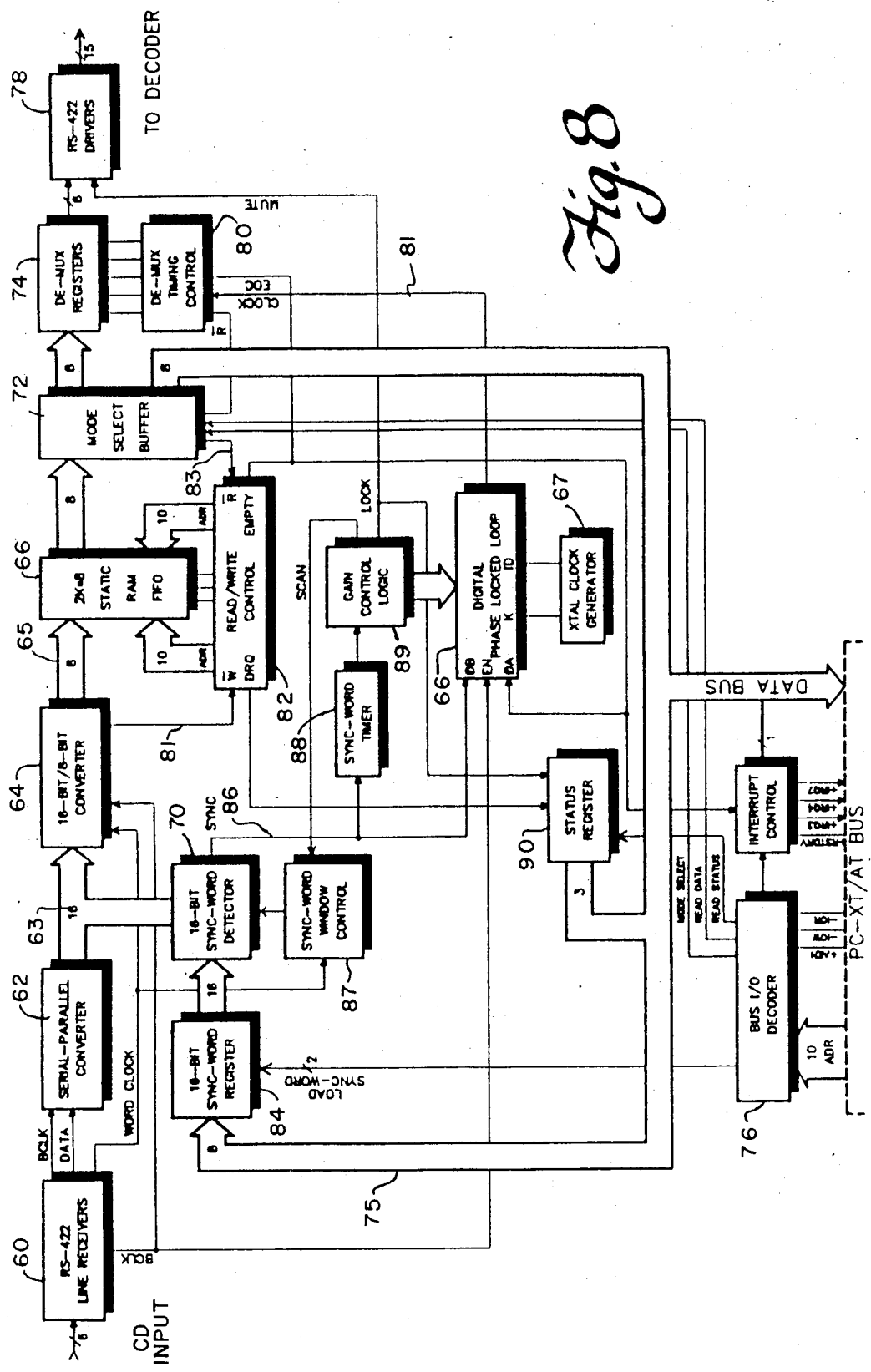
FIG. 8 is a detailed block circuit diagram of a preferred CDEX board of FIG. 5.

FIG. 8 is a detail block circuit diagram of the preferred CDEX board 34 of FIG. 5. In operation, line receiver 60 conditions the outputs (FIG. 6(c)) of the selected CD music ROM drive for transmission of the BCLK and DATA signals to serial-parallel converter 62, the WORD CLOCK signal to a 16-bit/8-bit converter 64, and the BCLK signal to a digital phase-locked loop circuit 66. It also transmits the WORD CLOCK signal to a sync-word window control circuit 87 which is explained later. Converter 62 prepares the serial data from the CD drives for parallel word manipulation over a 16-bit wide bus 63 while converter 64 converts 16-bit words to 8-bit bytes for manipulation by various registers, RAMs and buffers, and the PCXT/AT bus which we employed in constructing the invention. The BCLK signal clocks the status of the DATA line into a register of the converter 62 and upon accumulation of each 16 bits, converter 62 transfers them to converter 64 and to a sync-word detector 70 which asserts a SYNC signal at the end of each 1024-byte data block upon detecting the sync code, e.g. hexadecimal "AAAA". The WORD CLOCK signal also enables the converter 64 to divide the 16-bit words into two 8-bit bytes.

Once assembled in 8-bit bytes, converter 64 transmits the bytes to a 2K-by-8-bit RAM FIFO 66 via a bus 65.

FIFO 66 comprises two RAMs. While one loads data from the converter 64, the other dumps it to demux registers 74 via a mode select buffer 72 under control of a READ DATA signal. The READ DATA signal comes from the data processing system bus 75 through bus decoder 76. With respect to asynchronous data emanating from the CD music ROM players, the RAM FIFO 66 provides synchronous communication for the data processing system 42 and the decoder 36. Demux registers 74, under control of demux timing circuit 80, then pass the six high-speed Dolby ADM digital data streams to the decoder 36 (FIG. 5) for conversion to high-speed analog audio.

A read/write control circuit 82 controls reading and writing operations of FIFO 66. Being that reading and writing can occur at different time instances from respective RAMs in the FIFO 66, write control pulses transmitted over line 81 from converter 64 index address signals to effect writing of 8-bit bytes from the bus 65 into one of the FIFO RAMs, while read control pulses transmitted over line 83 by the mode select buffer 72 index 10-bit address signals to read data from a second RAM in the FIFO. An EOC signal from timing control circuit 80 is transmitted to the phase locked loop circuit 66 for tracking purposes. The sync word effects resetting of the FIFO RAMs.

During the decoding process, the CDEX tracks the flow of data transmitted from the CD music ROMs. To achieve tracking, the data processing system places on bus 75 two bytes of programmable bit code sequences representing the desired sync code, and clocks them into the 16-bit sync register in two successive operations, one at a time, under control of a LOAD SYNC WORD signal from bus decoder 76. Once loaded, sync detector 70 compares the incoming 16-bit words with the contents of register 84. The WORD CLOCK signal from the receivers 60 enables the sync-word window control circuit 87 to effect latching of a 16-bit word from the bus 63 into the sync-word detector 70. Upon a match, detector 70 asserts a SYNC signal on line 86 and supplies it to a sync word timer 88 and the digital phase locked loop circuit 66. In accordance with an aspect of this invention previously set forth, the digital phase locked loop circuit 66 compares the occurrences of the EOC signal and SYNC signal at respective inputs thereof in order to generate steering pluses that maintain constant the demux timing CLOCK signal. This CLOCK signal is supplied to demux timing control circuit 80 via line 81. The phase comparisons are made in the circuit 66 upon assertions of the BCLK signal received from the line receivers 60. Crystal clock generator 67 supplies the basic clock pulses to the loop circuit 66 which determine the phase and frequency of the demux CLOCK signal 81 supplied to the control circuit 80. Frequency synthesis techniques preferably are utilized. Digital phase locked loop circuit is implemented by a TI chip SN54LS297 available from Texas Instruments, Inc. of Dallas, Tex.

In accordance with another aspect of the invention, we provide a sync window control which essentially acts as a "flywheel" to assure greater accuracy in synchronization in the unfortunate case of losing one or more occurrences of the SYNC signal. Importantly, the "flywheel" enables the system to avoid "looking" at false sync words appearing in the music or other data passing through the system. Upon initial startup, sync word window control 87 enables detector 70 to detect the actual sync words in the first 144 blocks of data so that each real sync word pulse from detector 70 effects clocking of the demux timing control 80. A counter times out after the first 144 sync pulses, and an internally generated stable sync pulse drives the system. Window control 87 is controlled by the SCAN signal from gain control logic 89 which, when asserted, effects searching for sync codes in the entire data block and when deasserted effects searching only in the sync word byte (e.g. bytes 1022-1023). Upon reaching a Count of 144, counting action is stopped and the real sync word is blocked so that a counter in the sync word timer 88 produces the sync pulses to drive the demux control 80. A SCAN signal from gain control logic 89 opens the sync-word window to scan the entire block for the sync code until reaching the count of 144.

During periods of lock when a hardware circuit produces the sync pulses, a watchdog timer in the sync-word timing circuit 88 continues to "look" for the real sync words. If ten or more real consecutive sync words are missing during the data transmission, or if the phase detector indicates that phase lock is not with a predetermined tolerance, gain control logic 89 is reset and the processor is notified via the status of the LOCK signal from logic 89 that lock has been lost thereby to reinitialize the sync word search process in the entire data block. Upon notification of lost sync, processor 42 aborts the recording process.

The status register 90 latches the LOCK signal from the gain control logic 89, a DRQ signal from read/write control 82, and a READ STATUS signal from the I/O bus controller 76 for subsequent transmission to the data processing system via bus 75.

D. High-Speed ADM-To-Analog Decoder 36

High-speed ADM-to-analog decoder 36 (FIG. 1) plays back the Dolby delta-link ADM signals in analog form, but at the rapid 8× rate. Rather than operating between 20 Hz and 20 KHz at 1× speed, the high-speed decoder operates between 160 Hz and 160 KHz at 8× speeds. It includes circuitry similar to a commercially available Dolby ADM decoder but was modified to operate at 8× speed for decoding outputs from the CDEX board 34. Modification became necessary due to control signal feedthrough in the low-frequency portion of the audio spectrum during Dolby ADM decoding when operated a high speeds. At 1× decoding, resulting distortion of control signal feedthrough was tolerable, but at 8× decoding, these modifications became necessary. High-speed decoding was achieved by by-passing deemphasis control filtering of the low-frequency portion of the audio spectrum.

Figure 9A:
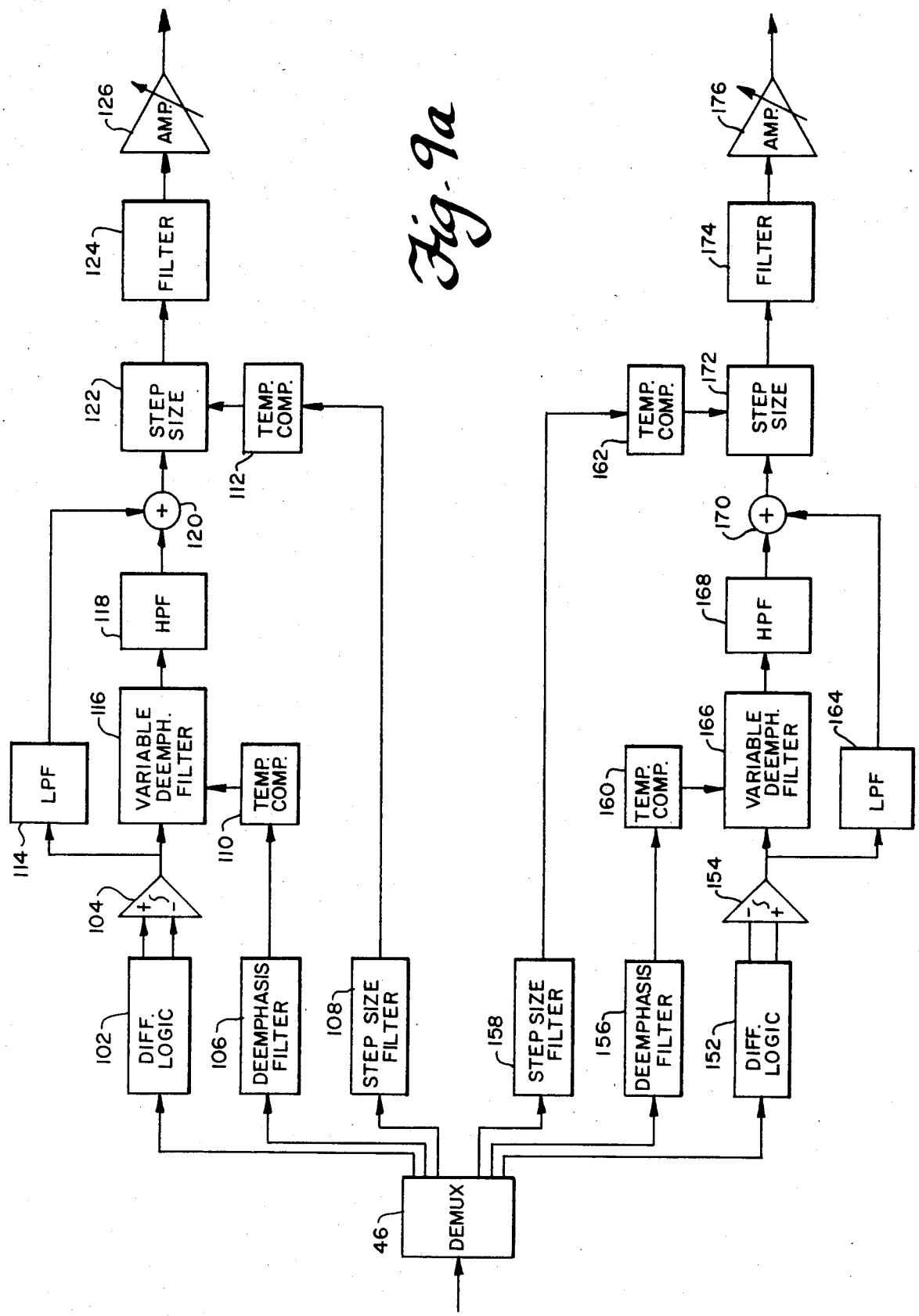
FIG. 9(a) depicts processing circuitry of the high-speed decoding circuit of the system of FIG. 5.
Figure 9B:
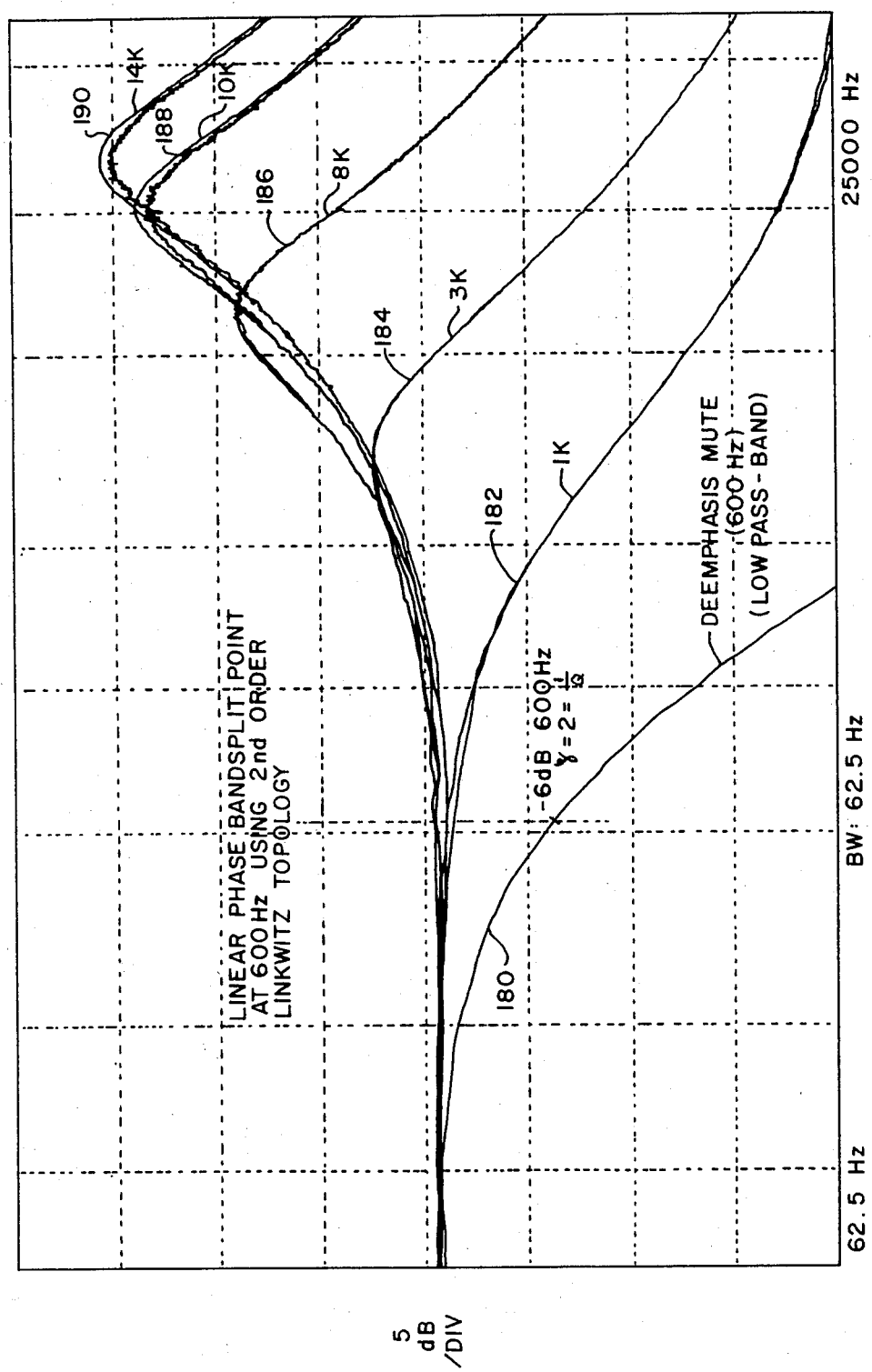
FIG. 9(b) depicts the preferred gain-versus-frequency characteristics of the high-speed decoder of FIG. 9(a).

FIGS. 9A and 9B depict the high-speed decoder 36 (FIG. 1) and the preferred gain versus frequency response of the decoder. In explanation, demultiplexer 46 outputs six digital data streams to the high-speed decoder. A data stream and two side chain data streams are supplied to each of two stereo channels which operate identical to each other. Thus, only one channel is explained. The data steam is supplied to differential logic circuit 102 which generates a pair of differential analog signals that are supplied to a differential integrator 104. Deemphasis data from demultiplexer 46 is transferred to a deemphasis filter 106 while step-size data is transferred to a step-size filter 108. Deemphasis filter 106 and step-size filter 108 develop analog control signals for controlling deemphasis and the step-size parameters during the decoding process. Temperature compensation circuits 110 and 112 provide temperature stabilization for the respective deemphasis and step-size control signals.

In accordance with an aspect of the invention, a portion of the low-frequency signal from integrator 104 is separately routed to a low-pass filter 114 while variable deemphasis filter 116 and high-pass filter 118 subject only a high-frequency portion of the audio signal to deemphasis control so as to reduce control signal feedthrough in the low-frequency portion of the signal. Filters 114 and 118 are second order Linkwitz filters. In accordance with known processes, the variable deemphasis filter responds to the temperature compensated control signal from the deemphasis filter 106. A summing circuit 120 recombines the low and high frequency portions prior to supplying the composite signal to step-size processor 122 for dynamic restoration. The step-size processor 122 responds to the temperature compensated control signal from the step-size filter 108.

Thus, it is seen that the low-frequency portion of the signal is not subjected to deemphasis control thereby avoiding associated distortion. Frequency division preferably is set at 600 Hz as a separation point to split the frequency band between low-pass filter 114 and variable deemphasis filter 116. After deemphasis and step-size processing, the audio signal is filtered by a conventional 25 µsecond deemphasis circuit 124 as performed in the usual Dolby ADM processing while variable amplifier 126 adjusts the level of the high-speed audio signal prior to supplying the same to high-speed recorder 38 (FIG. 5). Circuit elements 158 through 176 having like identities function identical to corresponding circuit elements 102 through 126, except they operate on the second of the two stereo channels.

FIG. 9B depicts the desired frequency versus gain response of the high-speed Dolby decoder. According to the gain characteristics, plot 180 shows the desired response of the low-pass filters 114 and 164 of respective stereo channels, while plots 182 through 190 show the desired response of variable deemphasis filters 116 and 166 at 1 KHz, 3 KHz, 8 KHz, 10 KHz and 14 KHz respectively. Variable gain of the respective frequency bands is achieved by utilizing the logarithmic properties of discrete bipolar transistors. In effect, the variable deemphasis filters 116 and 166 are implemented with voltage controlled attenuator (VCATs) which respond to the control signals from the deemphasis filters.

E. Data Processing System 42

The data processing system 42 (FIG. 5) is programmed to retrieve textual data (e.g., author, title, catalog, pricing, etc) from data blocks transmitted from the CDEX board 34 for the purpose of printing custom labels for the slave media as well as for other control and record keeping purposes. In one implementation, the processing system 42 retrieves program length information to control accurately the start-stop operations of the high-speed analog recorder 38 and controlling the switch 44 for queuing the CD music ROM carousels 30 and 32.

In order to produce the custom compilation, processor 42 receives requests from a cashier station identifying which programs are to be compiled and the corresponding CDs to be selected in order for generating the proper sequence of programs on the slave medium. Upon so determining, it issues instructions to load the CD music ROM carousels.

F. Real Time ADM Demultiplexer 43 & Dolby ADM Decoder 45

In order to listen to audio programs to confirm the recording process during high-speed transfers, the system may include means for developing composite data at real time speeds. In this case, the processor 42 stores digital data in a storage device, such as a winchester disk, and transmit the data at the appropriate speed to a demultiplexer 43. The demultiplexer 43 interfaces the data processing system 42 and a commercially available Dolby DP-85 decoder. It serves in the case of the operative embodiment of the present invention, to take data from an IBM PC bus 47 and convert it to the six digital data streams required for Dolby AMM processing of stereo signal pairs in real time. The demultiplexer 43 also generates the clock signals for the ADM decoder 45. In case where no high-speed recordings are required, the system may exclude the slave recording device and simply serve as a high-volume quick access reservoir of audio programs recallable at will for listening or broadcast, generally. Of course, for listening, a 1× decoder and speakers would be required.

G. Slave Tape Servobias System

In the case of employing magnetic tape cassettes as the slave media where Dolby B noise reduction is required, an aspect of the invention comprises a peak-limiting system to improve fidelity in the high-speed reproduction of the audio programs as set forth in incorporated commonly owned, U.S. patent application titled "Bias Control In Apparatus For Tape Recording" Ser. No. 109,190, filed of even date herewith. In the high-frequency spectrum of the audio band, e.g. nine to eighteen kilohertz, magnetic cassette tapes experience self-erasure effects due to typical narrow track widths employed therein. However, the premastered CD retains a good portion of the spectrum of the original master recording. Thus when employing Dolby B noise reduction techniques, distortion results if high rising peaks are sustained for more than a few milliseconds, as frequently the case with synthesized music. Accordingly, we developed a system for monitoring and limiting peaks in the premastering process in order to avoid deleterious effects in the analog signal emanating from the decoder 36 when recording a cassette using a Dolby B noise reduction tape.

To achieve this aspect, we interposed a peak limiting circuit and a Dolby noise reduction encoder between the analog audio output of the master playback device 10 and the digital audio encoder 12 of FIG. 1.

IV. CONCLUSION

We do not intend that the illustrative embodiments and methods set forth above be construed as a limitation of the invention defined by the appended claims. T those skilled in the art, several changes and modifications are apparent in view of the teachings herein. With respect to the decoding/reproduction system, be it known that the master and slave media may take on a variety of forms including CD music ROMs, magnetic tapes, data disk storage media, vinyl recordings. The media may be mapped or non-mapped with appropriate adjustment in the data accessing scheme. Moreover, information retrieved from or stored in the master media may be analog or digital. The division of functions performed by the respective components of the system may differ. For example, timing signals may originate in the CD ROM players, the CDEX board, the data processing system the decoder, or other component. A entirely separate clocking system may alternatively be provided. Each component may be configured to operate synchronously or asynchronously in any combination, despite the preferred structure and relationship shown and described. Preferably, the data processing system effects control of the entire system by convention data processing instructions, but control may be hard-wired, manual, distributed among the components, etc.

Accordingly, it is our intent to include all such modifications and changes as may come to those skilled in the art.

What is desired to be secured by United States Letters Patent is:

1. A high-speed recording apparatus for reproducing a customized group of audio programs on a slave medium wherein said programs are derived from encoded representations of master recordings contained on a master storage medium, said system comprising:
   A. memory means for storing in said master medium timing information and digitally encoded representations of said master recordings, said memory means further including indicia means associated with respective ones of said master recordings thereby to allow selected replication thereof, said representations being digitally encoded by high-efficiency sampling techniques adapted for high-speed replication,
   B. high-speed reproduction means including at least one reproducer for providing greater-than-real-time recording of audio programs on an associated slave medium, and
   C. controller means connected with said memory means and said reproduction means, said controller means being responsive to said indicia means and said timing information for selectively accessing and effecting reproduction of said master recordings on said slave medium thereby producing said customized group of selected audio programs.

2. A high-speed reproduction system as recited in claim 1 wherein said memory means comprises a compact disk music ROM having associated drive means for optically storing encoded representations of said master recordings.

3. A high-speed reproduction system as recited in claim 2 wherein said memory means comprises a plurality of compact disk music ROMs in a juke box, and said controller means further includes scheduling means for scheduling information flow among respective ones of said music ROM drives and said at least one reproducer.

4. A high-speed reproduction system as recited in claim 3 wherein said memory means comprises at least two of said juke boxes for storing redundant master recordings, and said controller means includes continuous recording means for attaining substantially constant spacing between multiple audio programs recorded on said slave medium by alternately accessing master recordings from said juke boxes thereby to ready a next program to be recorded in succession while a first program is being recorded.

5. A high speed recording system as recited in claim 1 wherein said slave medium comprises a magnetic cassette tape for recording analog signals representing said audio programs.

6. A high-speed recording system as recited in claim 5 wherein said master recording includes peak limiting means for limiting predetermined peaks in the master recordings, said master recordings being further encoded according to Dolby B noise reduction techniques, and said reproduction means further includes servo biasing means for improving the fidelity of audio programs recorded said slave medium.

7. A high-speed recording systems as recited in claim 1 wherein said slave medium comprises a write-once compact disk music ROM.

8. An apparatus for high-speed reproduction of audio programs on a slave medium in a data processing environment wherein the programs are derived from encoded representations of audio programs stored on a master storage medium, said apparatus producing a customize group of audio programs on said slave medium and comprising:
   A. a data processing system for handling digital data and processing instructions for reproduction of audio programs,
   B. memory means for storing digitally encoded data signals representing said audio programs, said memory means further including catalog information associated with respective ones of said audio programs thereby to allow selected access thereof and timing information useful for generation clocking signals permitting extractions of data therefrom,
   C. decoder means utilizing said timing information for extracting data from said memory means and converting said encoded digital data signals of said memory means to a format compatible with said data processing system,
   D. reproduction means including at least one reproducer for recording said audio program on a slave medium, and
   E. said data processing system including means for controlling said memory means and said reproduction means in accordance with said catalog information to access selected programs and to reproduce said programs on said slave medium thereby to produce said customize group of audio programs.

9. An apparatus as recited in claim 8 wherein said encoded digital representations of said audio programs stored in said memory means comprises time-domain condensed digital representations.

10. An apparatus as recited in claim 8 wherein said encoded digital representations of said audio programs stored in said memory means comprises adaptive delta modulated digital representations of said audio programs.

11. An apparatus as recited in claim 1 or 8 further including:
   F. order entry means for enabling a user to select audio programs to produce custom recordings thereof including means for receiving input indicia to identify desired audio programs, said data processing system being responsive to said input indicia to selected audio programs to be reproduced by said reproduction means.

12. An apparatus as recited in claim 11 wherein said order entry means directly couples said data processing system via a local area communications link.

13. An apparatus as recited in claim 12 wherein said order entry means is remote from data processing system, and further including means for establishing communications between said order entry means and said controller means to effect reproduction of said audio programs on said slave medium.

14. An apparatus as recited in claim 1 or 8 wherein said data processing system further includes cache memory means for temporarily storing digital data, means for retrieving digital data representation of audio programs from said memory means and for transferring said data to said cache memory means, and means connected to said cache memory means for reproducing audible samples of audio programs.

15. An apparatus as recited in claim 1 or 8 further comprising means for retrieving and selectively reproducing audible samples of audio programs stored in said memory means.

16. An apparatus as recited in claim 1 or 8 wherein said memory means comprises rotating disc storage means.

17. An apparatus as recited in claim 1 or 8 wherein said memory means comprises rotating magnetic means for storing digital signals representative of said audio programs.

18. An apparatus as recited in claim 2 wherein said compact disk music ROM drive means includes speed enhancement means for multiplying the data transfer rate thereof thereby to enable faster-than-real-time production of audio programs on said slave medium.

19. An apparatus as recited in claim 1 further including backup archival means located remote from a point-of-sale terminal for storing duplicates of information stored in said memory means, and means for communicating selection information to said backup archival means for reproducing said customized selections.

20. In a method for producing a high-speed recording of an audio program, a method of preprocessing an analog representation of said audio program comprising the steps of:
   A. sampling an analog representation of said audio program by adaptive delta modulation technique thereby to produce at least a digital data stream and two digital side chains associated therewith for each audio channel,
   B. multiplexing each data stream and associated side chains to generate a multiplexed data stream adapted to be processed by a data processing system,
   C. data blocking said multiplexed data stream into data blocks suitable for storage in a digital storage medium,
   D. converting said data blocks to a format of a compact disk music ROM, and
   E. producing a recording of said audio program by extracting CD formatted data from said compact disk music ROM at greater-than-real-time speeds.

21. A method as recited in claim 20 further comprising, in said processing step, generating a synchronizing word within said data blocks, and in said producing step, producing said recording from successive data blocks by synchronizing the extracting of CD formatted data blocks with occurrences of said synchronizing word appearing therein.

22. A method as recited in claim 21 further comprising, in said producing step, adjusting time instance of conversion of each data block by phase-comparing the occurrences of said synchronizing word and a crystal-controlled oscillator thereby to produce a closed-loop tracking signal.

23. A method as recited in claim 22 further comprising, in said producing step, time-base correcting the extraction of data in said data blocks in accordance with said closed-loop tracking signal.

24. A method as recited in claim 20 further comprising the step of:
F. extracting indicia data from said data blocks for producing printed textual information to be affixed to said produced audio recording.

25. A method as recited in claim 24 wherein said indicia data includes pricing and catalog information, said method further comprising, in the data blocking step, scrambling said indicia information in order to provide security as to the contents thereof, and in said producing step, descrambling said scrambled indicia information in order to produce said textual information.

26. A method as recited in claim 20 wherein multiple audio programs are decoded, said method further comprising, in said converting step, placing a precisely controlled amount of silence between each audio program, and in said producing step, detecting said silence between respective programs in order to control start-stop operations of said producing.

* * * * *